US007867085B2

(12) United States Patent
Pryzby et al.

(10) Patent No.: US 7,867,085 B2
(45) Date of Patent: Jan. 11, 2011

(54) GAMING MACHINE ENVIRONMENT HAVING CONTROLLED AUDIO AND VISUAL MEDIA PRESENTATION

(75) Inventors: Eric M. Pryzby, Skokie, IL (US); Richard T. Schwartz, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1239 days.

(21) Appl. No.: 11/222,709

(22) Filed: Sep. 9, 2005

(65) Prior Publication Data

US 2006/0009285 A1 Jan. 12, 2006

Related U.S. Application Data

(63) Continuation-in-part of application No. 10/342,720, filed on Jan. 16, 2003, now Pat. No. 7,364,508, and a continuation-in-part of application No. 10/342,817, filed on Jan. 16, 2003.

(51) Int. Cl.
*A63F 9/24* (2006.01)
*A63F 13/00* (2006.01)

(52) U.S. Cl. ............................ 463/30; 463/31; 463/34; 463/35; 463/42

(58) Field of Classification Search .............. 463/30–35
See application file for complete search history.

(56) References Cited

U.S. PATENT DOCUMENTS

| | | | | |
|---|---|---|---|---|
| 3,533,629 | A | 10/1970 | Raven | 273/138 |
| 4,522,399 | A | 6/1985 | Nishikawa | 273/143 R |
| 4,679,143 | A | 7/1987 | Hagiwara | 364/411 |
| 4,837,728 | A | 6/1989 | Barrie et al. | 364/412 |
| 5,133,017 | A | 7/1992 | Cain et al. | |
| 5,259,613 | A * | 11/1993 | Marnell, II | 463/42 |
| 5,318,298 | A | 6/1994 | Kelly et al. | 273/122 R |

(Continued)

FOREIGN PATENT DOCUMENTS

AU 199943487 A1 3/2000

(Continued)

OTHER PUBLICATIONS

Weinert, Joe, "Entertainment Vehicles," International Gaming Wagering Business, pp. 11-12 and 15-18 (Mar. 1997).

*Primary Examiner*—John M Hotaling, II
*Assistant Examiner*—Steven J. Hylinski
(74) *Attorney, Agent, or Firm*—Nixon Peabody LLP

(57) ABSTRACT

A gaming machine system comprises a plurality of multimedia output devices, including audio, visual, and/or tactile devices strategically mounted around a casino. The multimedia devices may be used to present celebratory sights, sounds, and/or other sensations throughout the casino when a player achieves a winning outcome. The celebratory sights, sounds, and/or other sensations increase the overall level of stimuli in the casino, thereby helping to create a celebratory atmosphere. In some embodiments, the celebratory multimedia stimuli are communicated to certain gaming machines in the casino based on a triggering event that occurred at a remote gaming machine. The gaming machines may be the same type and/or brand, or they may be different types and/or brands such that the same celebratory stimuli are used to promote multiple types and/or brands of gaming machines. The celebratory stimuli may also be customized specifically for a gaming machine, a player(s), or a casino.

25 Claims, 10 Drawing Sheets

U.S. PATENT DOCUMENTS

| | | | | | |
|---|---|---|---|---|---|
| 5,326,104 | A | * | 7/1994 | Pease et al. | 463/18 |
| 5,370,399 | A | | 12/1994 | Liverance | 273/434 |
| 5,409,225 | A | * | 4/1995 | Kelly et al. | 273/118 A |
| 5,444,786 | A | | 8/1995 | Raviv | |
| 5,469,510 | A | | 11/1995 | Blind et al. | |
| 5,472,195 | A | * | 12/1995 | Takemoto et al. | 463/31 |
| 5,524,888 | A | | 6/1996 | Heidel | 463/22 |
| 5,533,727 | A | | 7/1996 | DeMar | 463/23 |
| 5,542,669 | A | | 8/1996 | Charron et al. | 463/13 |
| 5,547,192 | A | | 8/1996 | Ishibashi | 463/26 |
| 5,564,700 | A | * | 10/1996 | Celona | 463/27 |
| 5,580,309 | A | | 12/1996 | Piechowiak et al. | 463/16 |
| 5,655,961 | A | | 8/1997 | Acres et al. | 463/27 |
| 5,695,188 | A | | 12/1997 | Ishibashi | 273/143 R |
| 5,735,743 | A | * | 4/1998 | Murata et al. | 463/35 |
| 5,743,798 | A | | 4/1998 | Adams et al. | 463/17 |
| 5,762,552 | A | | 6/1998 | Vuong et al. | 463/25 |
| 5,772,509 | A | * | 6/1998 | Weiss | 463/16 |
| 5,775,993 | A | | 7/1998 | Frentz et al. | 463/17 |
| 5,779,544 | A | * | 7/1998 | Seelig et al. | 463/6 |
| 5,807,177 | A | | 9/1998 | Takemoto et al. | 463/47 |
| 5,816,918 | A | | 10/1998 | Kelly et al. | 463/16 |
| 5,828,768 | A | | 10/1998 | Eatwell et al. | |
| 5,833,538 | A | | 11/1998 | Weiss | 463/21 |
| 5,851,148 | A | | 12/1998 | Brune et al. | 463/25 |
| 5,876,284 | A | | 3/1999 | Acres et al. | 463/25 |
| 5,941,773 | A | | 8/1999 | Harlick | 463/26 |
| 5,971,850 | A | | 10/1999 | Liverance | 463/23 |
| 6,032,955 | A | * | 3/2000 | Luciano et al. | 273/138.1 |
| 6,056,640 | A | * | 5/2000 | Schaaij | 463/4 |
| 6,068,552 | A | | 5/2000 | Walker et al. | 463/21 |
| 6,089,663 | A | | 7/2000 | Hill | 297/258.1 |
| 6,110,041 | A | | 8/2000 | Walker et al. | 463/20 |
| 6,110,043 | A | * | 8/2000 | Olsen | 463/27 |
| 6,146,273 | A | * | 11/2000 | Olsen | 463/27 |
| 6,162,121 | A | | 12/2000 | Morro et al. | 463/16 |
| 6,179,710 | B1 | * | 1/2001 | Sawyer et al. | 463/16 |
| 6,217,448 | B1 | | 4/2001 | Olsen et al. | 463/25 |
| 6,231,445 | B1 | * | 5/2001 | Acres | 463/42 |
| 6,254,483 | B1 | | 7/2001 | Acres | 463/26 |
| 6,302,790 | B1 | | 10/2001 | Brossard | 463/20 |
| 6,308,953 | B1 | | 10/2001 | Nagano | 273/143 R |
| 6,315,666 | B1 | | 11/2001 | Mastera et al. | 463/31 |
| 6,319,125 | B1 | * | 11/2001 | Acres | 463/25 |
| 6,375,567 | B1 | * | 4/2002 | Acres | 463/25 |
| 6,416,411 | B1 | | 7/2002 | Tsukahara | 463/35 |
| 6,422,941 | B1 | | 7/2002 | Thorner et al. | 463/30 |
| 6,471,589 | B1 | | 10/2002 | Nagano | 463/21 |
| 6,530,842 | B1 | | 3/2003 | Wells et al. | 463/46 |
| 6,561,908 | B1 | * | 5/2003 | Hoke | 463/35 |
| 6,609,975 | B1 | * | 8/2003 | Sawyer et al. | 463/26 |
| 6,638,167 | B1 | * | 10/2003 | Sawyer et al. | 463/26 |
| 6,638,169 | B2 | | 10/2003 | Wilder et al. | 463/35 |
| 6,656,046 | B1 | * | 12/2003 | Yoseloff et al. | 463/20 |
| 6,656,048 | B2 | * | 12/2003 | Olsen | 463/25 |
| 6,676,514 | B1 | | 1/2004 | Kusuda et al. | 463/24 |
| 6,805,633 | B2 | * | 10/2004 | Hein et al. | 463/35 |
| 6,843,725 | B2 | | 1/2005 | Nelson | 463/40 |
| 6,848,996 | B2 | | 2/2005 | Hecht et al. | 463/35 |
| 6,875,110 | B1 | * | 4/2005 | Crumby | 463/42 |
| 6,922,730 | B1 | * | 7/2005 | Yaple | 709/231 |
| 6,923,720 | B2 | * | 8/2005 | Loose | 463/16 |
| 6,935,955 | B1 | * | 8/2005 | Kaminkow et al. | 463/35 |
| 6,968,063 | B2 | | 11/2005 | Boyd | 381/57 |
| 7,008,324 | B1 | * | 3/2006 | Johnson et al. | 463/42 |
| 7,297,059 | B2 | * | 11/2007 | Vancura et al. | 463/27 |
| 7,364,508 | B2 | * | 4/2008 | Loose et al. | 463/30 |
| 7,371,175 | B2 | * | 5/2008 | Gilboy et al. | 463/35 |
| 7,419,425 | B1 | * | 9/2008 | Crowder et al. | 463/16 |
| 7,465,226 | B2 | * | 12/2008 | Ikeya et al. | 463/16 |
| 7,479,063 | B2 | * | 1/2009 | Pryzby et al. | 463/35 |
| 2001/0004607 | A1 | * | 6/2001 | Olsen | 463/26 |
| 2002/0037759 | A1 | * | 3/2002 | Aldridge | 463/1 |
| 2002/0037763 | A1 | | 3/2002 | Idaka | 463/16 |
| 2002/0039919 | A1 | | 4/2002 | Joshi et al. | 463/20 |
| 2002/0090990 | A1 | | 7/2002 | Joshi et al. | 463/20 |
| 2002/0142825 | A1 | | 10/2002 | Lark et al. | 463/16 |
| 2002/0142846 | A1 | | 10/2002 | Paulsen | 463/43 |
| 2002/0151349 | A1 | | 10/2002 | Joshi | 463/20 |
| 2003/0054881 | A1 | | 3/2003 | Hedrick et al. | 463/29 |
| 2003/0055984 | A1 | * | 3/2003 | Shimakawa et al. | 709/227 |
| 2003/0073490 | A1 | | 4/2003 | Hecht et al. | 463/35 |
| 2003/0073491 | A1 | | 4/2003 | Hecht et al. | 463/35 |
| 2003/0100359 | A1 | | 5/2003 | Loose et al. | 463/20 |
| 2003/0114214 | A1 | | 6/2003 | Barahona | |
| 2003/0181231 | A1 | * | 9/2003 | Vancura et al. | 463/9 |
| 2003/0211881 | A1 | * | 11/2003 | Walker et al. | 463/20 |
| 2003/0220139 | A1 | * | 11/2003 | Peterson | 463/30 |
| 2003/0228902 | A1 | * | 12/2003 | Walker et al. | 463/25 |
| 2004/0029637 | A1 | | 2/2004 | Hein, Jr. et al. | 463/35 |
| 2004/0053695 | A1 | | 3/2004 | Mattice et al. | 463/42 |
| 2004/0082388 | A1 | | 4/2004 | Simsek et al. | 463/43 |
| 2004/0138889 | A1 | | 7/2004 | Gilboy et al. | 704/270 |
| 2004/0142748 | A1 | | 7/2004 | Loose et al. | |
| 2004/0147316 | A1 | | 7/2004 | Nagano | 463/35 |
| 2005/0054430 | A1 | * | 3/2005 | Pitman et al. | 463/25 |
| 2005/0239545 | A1 | * | 10/2005 | Rowe | 463/29 |
| 2006/0116187 | A1 | * | 6/2006 | Johnson et al. | 463/16 |
| 2006/0281548 | A1 | * | 12/2006 | Manz | 463/35 |
| 2007/0218970 | A1 | * | 9/2007 | Patel et al. | 463/16 |

FOREIGN PATENT DOCUMENTS

| | | | |
|---|---|---|---|
| EP | 0081 119 | | 6/1983 |
| EP | 0977 856 | | 2/2002 |
| JP | 3-297483 | A2 | 12/1991 |
| JP | 5-31254 | | 2/1993 |
| JP | 7-289730 | A2 | 11/1995 |
| JP | 9-299551 | A2 | 11/1997 |
| JP | 10-277213 | | 10/1998 |
| JP | 2001-728 | | 1/2001 |
| JP | 2003-919 | A2 | 1/2003 |
| JP | 2003-88614 | A2 | 3/2003 |
| JP | 2003-88615 | A2 | 3/2003 |
| JP | 2003-220271 | A2 | 8/2003 |
| JP | 2003-250981 | A2 | 9/2003 |
| JP | 2003-250982 | A2 | 9/2003 |
| JP | 2003-310872 | A2 | 11/2003 |
| WO | WO 01/05477 | | 1/2001 |
| WO | WO 01/33905 | | 5/2001 |
| WO | WO 02/24288 | | 3/2002 |
| WO | WO 02/40921 | | 5/2002 |

* cited by examiner

GAMING MACHINE ENVIRONMENT HAVING CONTROLLED AUDIO AND VISUAL MEDIA PRESENTATION

RELATED APPLICATIONS

This application for patent is a continuation-in-part of U.S. patent application Ser. No. 10/342,720, entitled "Gaming Machine Environment Having Controlled Audio and Visual Media Presentation," filed Jan. 16, 2003. This application for patent is also a continuation-in-part of U.S. patent application Ser. No. 10/342,817, entitled "Audio Network for Gaming Machines," filed Jan. 16, 2003. Both of these applications are incorporated herein by reference in their entirety.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and, more particularly, to a gaming machine and a gaming machine network having enhanced audio and visual effects created by remotely located projecting lights, displays, and speakers.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Consequently, shrewd operators strive to employ the most entertaining and exciting machines available because such machines attract frequent play and, hence, increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "secondary" or "bonus" game which may be played in conjunction with a "basic" game. The bonus game may comprise any type of game, either similar to or completely different from the basic game. The bonus game is typically entered upon the occurrence of a selected event or outcome within the basic game. Such a bonus game produces a significantly higher level of player excitement than the basic game because it provides a greater expectation of winning than the basic game and is accompanied by more attractive or unusual video displays and/or audio.

Most types of enhancement, however, have focused primarily on visual effects. For example, gaming machines may included various types of displays for displaying different images in an "attract mode" to stir interest in players. Other examples include the visual effects of the game features, such as reels and symbols, being changed to be more attractive.

While these player-appeal features provide some enhanced excitement relative to other known games, there is a continuing need to develop new features for gaming machines to satisfy the demands of players and operators. Preferably, such new features will further enhance the level of player excitement. The present invention is directed to satisfying these needs.

SUMMARY OF THE INVENTION

The present invention is directed to a gaming machine system having a plurality of multimedia output devices, including audio, visual, and/or tactile devices strategically mounted around a casino. The multimedia devices may be used to present celebratory sights, sounds, and/or other sensations throughout the casino when a player achieves a winning outcome. The celebratory sights, sounds, and/or other sensations increase the overall level of stimuli in the casino, thereby helping to create a celebratory atmosphere. In some embodiments, the celebratory multimedia stimuli are communicated to certain gaming machines in the casino based on a triggering event that occurred at a remote gaming machine. The gaming machines may be the same type and/or brand, or they may be different types and/or brands such that the same celebratory stimuli are used to promote multiple types and/or brands of gaming machines. The celebratory stimuli may also be customized specifically for a gaming machine, a player or players, or a casino.

In one aspect, the invention is directed to a method of creating a celebratory atmosphere in a casino. The method comprises the steps of receiving a wager input at a gaming machine in the casino and initiating a wagering game on the gaming machine, the wagering game having an outcome randomly selected from a plurality of outcomes, and the plurality of outcomes including a special events outcome. In response to the special events outcome being selected as the outcome, celebratory multimedia stimuli are presented through one or more media devices located in other areas of the casino, the other areas being remote from the gaming machine such that patrons in the other areas are otherwise unable to discern that the special events outcome has been selected as the outcome.

In another aspect, the invention is directed to a gaming system in a casino. The system comprises a network, a plurality of gaming machines coupled to the network, each gaming machine capable of conducting a wagering game having an outcome randomly selected from a plurality of outcomes, the plurality of outcomes including a special events outcome, and a controller coupled to the gaming machines via the network. In response to the special events outcome being selected as the outcome at one of the gaming machines, the controller is operative to cause celebratory multimedia content to be presented through one or more media devices located in other areas of the casino, the other areas being remote from the one of the gaming machines such that patrons at the other areas are otherwise unable to discern that the special events outcome has been selected as the outcome at the one of the gaming machines.

In still another aspect, the invention is directed to a method of creating a celebratory atmosphere in a casino. The method comprises detecting an occurrence of a triggering event in a gaming machine of the casino, and presenting celebratory multimedia stimuli to players in the casino through one or more media devices in areas of the casino. At least one of the areas is remote from the gaming machine such that patrons at the other areas are otherwise unable to discern the occurrence of the triggering event, the celebratory multimedia stimuli having a content that includes at least a celebratory audio content and a celebratory video content.

The above summary of the invention is not intended to represent each embodiment, or every aspect, of the invention. This is the purpose of the figures and the detailed description that follows.

BRIEF DESCRIPTION OF THE DRAWINGS

The foregoing and other advantages of the invention will become apparent upon reading the following detailed description and upon reference to the drawings.

Figure 1:
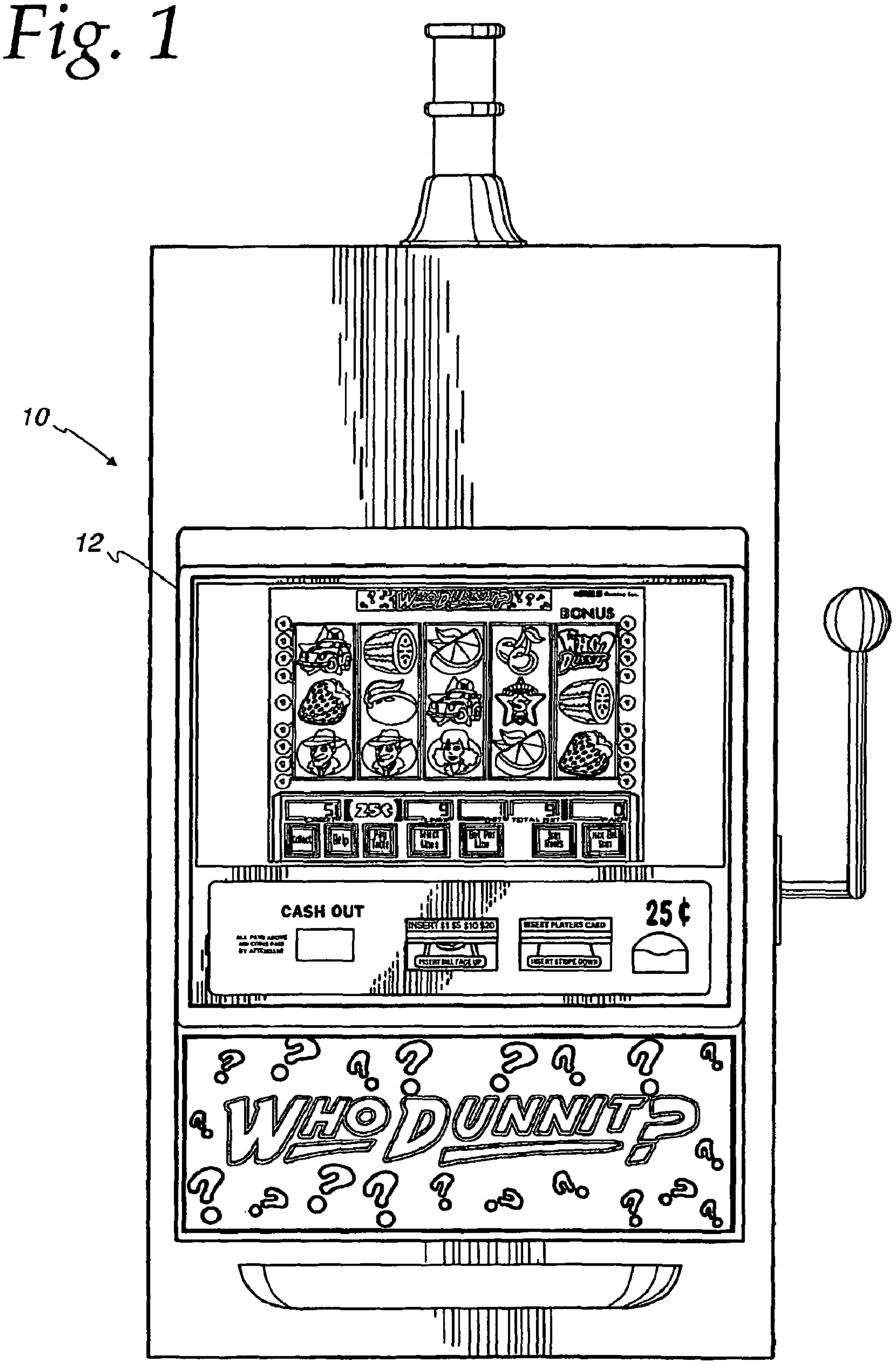
FIG. 1 is a simplified front view of a slot machine according to embodiments of the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a video gaming machine 10 is depicted that operates a basic wagering game, which may lead to a bonus game if certain outcomes are achieved in the basic game. The gaming machine 10 includes a game cabinet having a video display 12 that may comprise a dot matrix, CRT, LED, LCD, electroluminescent display, or generally any type of video display known in the art. In the illustrated embodiment, the gaming machine 10 is an "upright" gaming terminal in which the video display 12 includes a touch screen and is oriented vertically relative to the player. It will be appreciated, however, that any of several other models of gaming machines are within the scope of the invention, including, for example, a "slant-top" version in which the video display is slanted at about a 30° angle toward the player, or gaming machines that include mechanical, rather than video, displays.

In one embodiment, the gaming machine 10 is operable to play a game entitled WHO DUNNIT?™ having a mystery theme. The WHO DUNNIT?™ game features a basic game in the form of a slot machine with five simulated spinning reels and a bonus game, which may include strategy options that direct game activities on the video display 12. It will be appreciated, however, that the gaming machine 10 may be implemented with games other than the WHO DUNNIT?™ game and/or with several alternative game themes.

Figure 2:
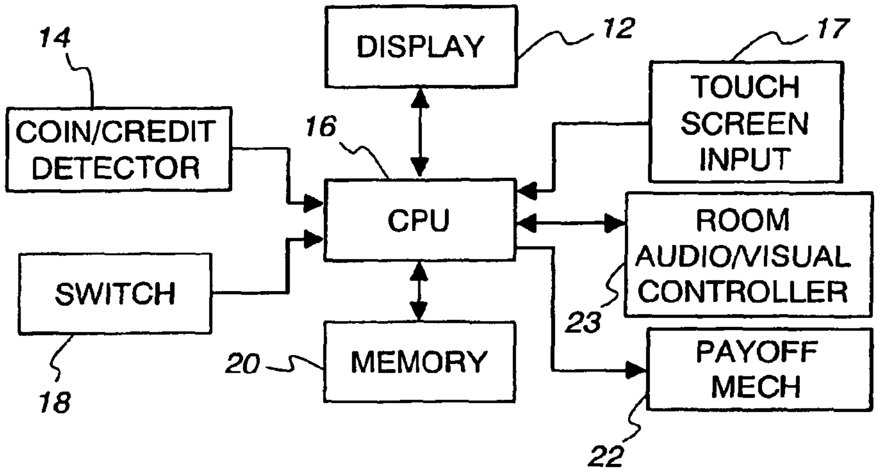
FIG. 2 is a block diagram of a control system suitable for operating the gaming machine in FIG. 1.

FIG. 2 is a block diagram of a control system suitable for operating the gaming machine 10. Coin/credit detector 14 signals a CPU 16 when a player has inserted a number of coins or played a number of credits. Then, the CPU 16 executes a game program which causes the video display 12 to display the basic game that includes simulated reels with symbols displayed thereon. The player may select a number of paylines to play, as is known in the art, and the wager amount may be entered via touch screen input keys 17 or other input devices on the game cabinet. The basic game commences in response to the player activating a switch 18, which is a lever or push button, causing the CPU 16 to set the reels in motion, randomly select a game outcome, and then stop the reels to display symbols corresponding to the preselected game outcome. In one embodiment, certain basic game outcomes cause the CPU 16 to enter a bonus mode, which causes the video display 12 to show a bonus game, as is known in the art.

A system memory 20 stores control software, operational instructions, and data associated with the gaming machine 10. In one embodiment, the system memory 20 comprises a separate read-only memory (ROM) and battery-backed random-access memory (RAM). It will be appreciated, however, that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes, which may occur in the basic game or bonus game. The payoff amounts corresponding to certain combinations of symbols in the basic game are predetermined according to a pay table stored in system memory 20. The payoff amounts corresponding to certain outcomes of the bonus game are also stored in system memory 20.

As shown in FIG. 2, the CPU 16 for the gaming machine 10 is coupled to a gaming room audio/visual controller 23 (hereinafter "the A/V controller"). The A/V controller 23 is used for controlling the audio and visual effects in the gaming room in which the gaming machine 10 resides. As will be described below in more detail, the A/V controller 23 is coupled to a plurality of speakers and a plurality of projecting lights, and actuates those components in response to certain triggering events occurring in the gaming machine 10. The triggering events may be the entering of a bonus game, achieving a certain monetary win, a randomly selected time, or a randomly selected event such as a random number of pulls of a slot arm on a slot machine. The A/V controller 23 may be located internal to the gaming machine 10, may be part of a central gaming controller in the casino, or may be an application-specific controller that is linked and external to a plurality of game machines 10. This latter configuration is illustrated in FIG. 3.

In one basic system configuration, the gaming machine 10 stores data related to the audio and visual effects (hereinafter "A/V data") in the memory 20. The CPU 16, in response to a certain triggering event, then retrieves the A/V data from memory 20 and sends the A/V data to the A/V controller 23. The A/V controller 23 then actuates the speakers and projecting lights in accordance with the A/V data. Preferably, the audio data within the A/V data is in a digital format. As such, the A/V controller 23 must include components and circuitry for converting the digital audio data to analog audio signals, and amplifying those analog signals to produce an output from the speakers. In one preferred embodiment, the audio data is stored in a surround-sound format for broadcasting a surround-sound audio output from a plurality of speakers 23 spatially arranged around the gaming machine 10.

Figure 4:
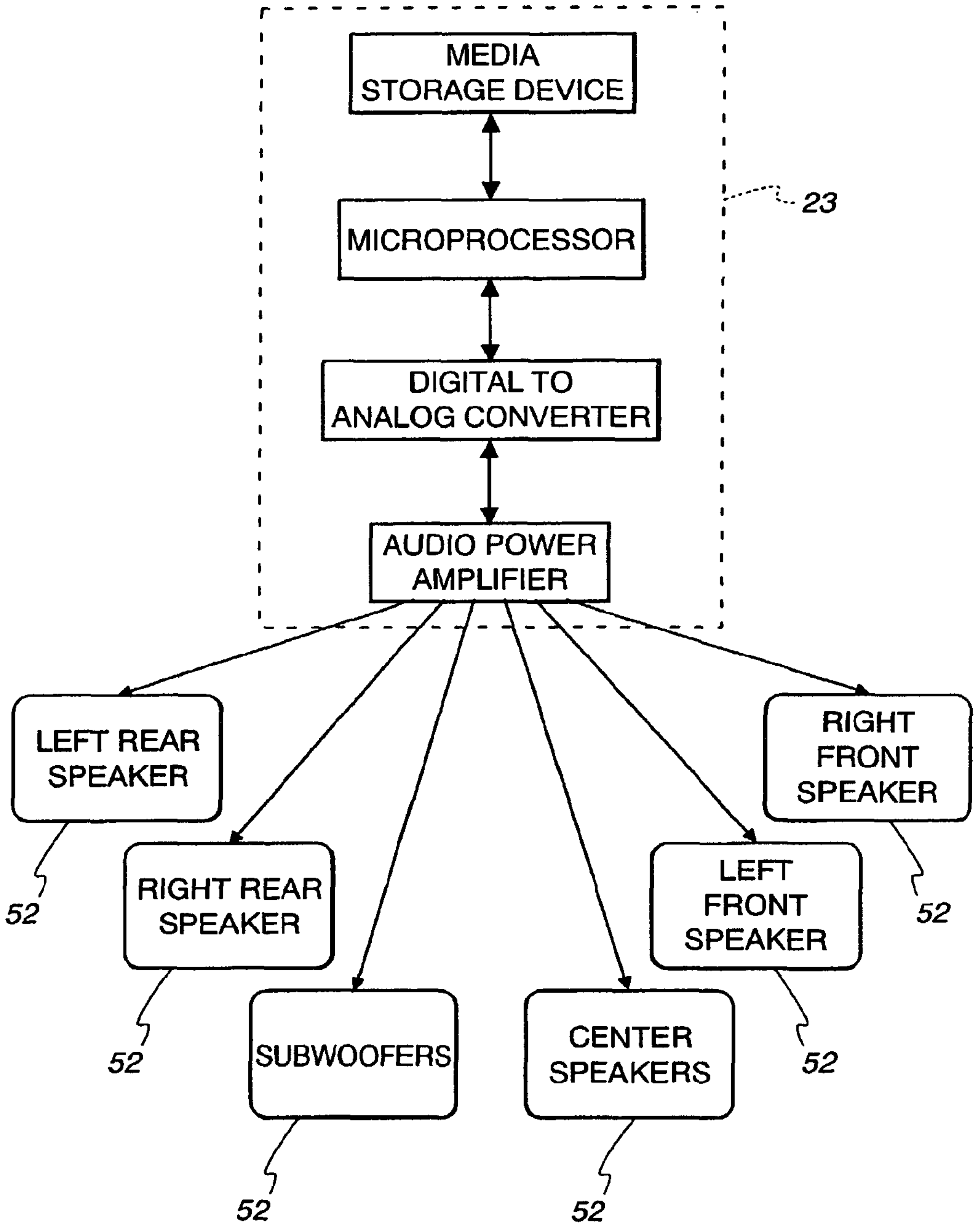
FIG. 4 illustrates a flow chart schematically showing the processing of audio signals.

Rather than storing the A/V data in the gaming machines 10, other system configurations can be utilized as well so as to achieve enhanced audio and visual effects for a player of the gaming machine 10. For example, the A/V data can be stored within a memory device directly coupled to the A/V controller 23, as is shown in FIG. 4 in which the memory storage device is within the A/V controller 23. In such an embodiment, the memory device may only store A/V data. In this system configuration, the CPU 16 simply needs to transmit a signal to the A/V controller 23 indicating which triggering event has occurred, and the A/V controller 23 selects the corresponding A/V data for that triggering event. This system configuration allows for a more sophisticated audio and visual experience without overburdening the CPU 16 and the memory 20 of the gaming machine 10.

Figure 3:
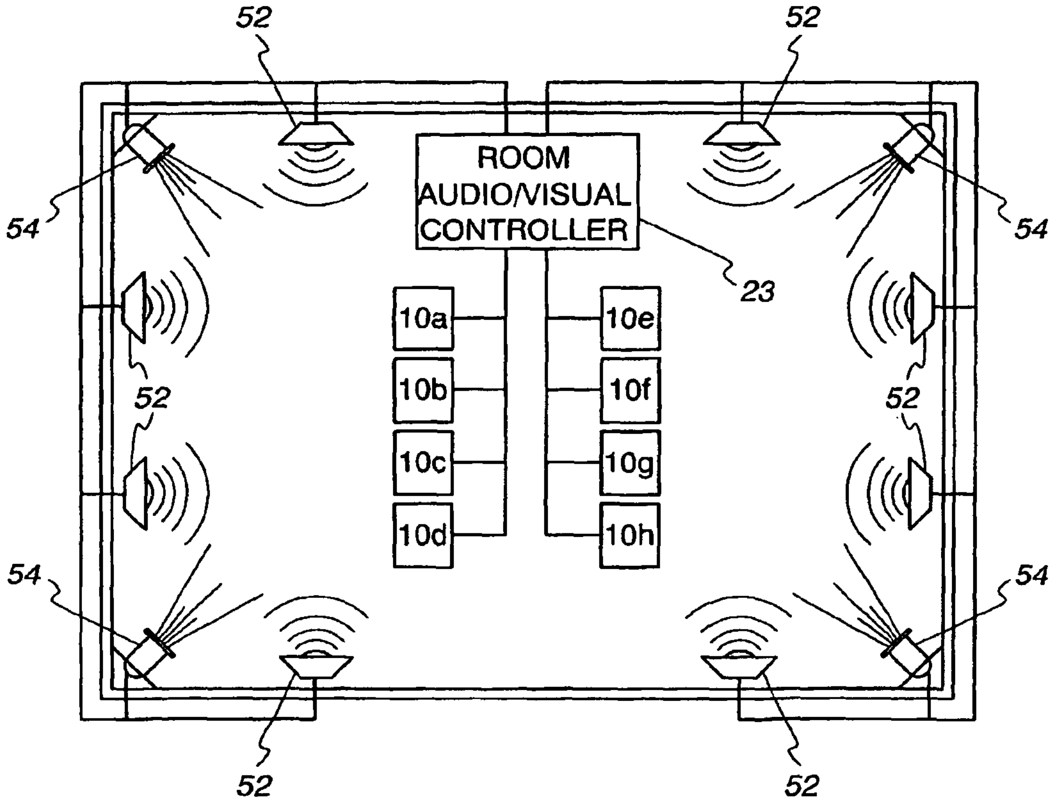
FIG. 3 illustrates one embodiment of the invention in which a bank of gaming machines resides in a gaming room providing enhanced audio and visual effects.

Referring now to FIG. 3, a gaming room 50 includes a plurality of gaming machines 10*a-h*. The gaming machines 10*a-h* may offer the same game, but may also present different games for players. Even if different games are present, the different games being played on the gaming machines 10*a-h* may all have the same theme, such as a game-show theme or a sports theme.

The gaming room 50 includes a plurality of speakers 52 that are remotely placed around the gaming machines 10*a-h*. Further, a plurality of projecting lights 54 is remotely located around the gaming machines 10*a-h*. In this configuration, the gaming machines 10*a-h* are coupled to the A/V controller 23, which is remotely located from the gaming machines 10*a-h*. The A/V controller 23 is further coupled to the speakers 52 and the projecting lights 54. Based on the triggering signals received from the gaming machines 10*a-h*, the A/V controller 23 selectively controls the audio output from the speakers 52 and the light patterns from the projecting lights 54. Preferably, the speakers 52 and projecting lights 54 are arranged so that regardless of which gaming machine achieves a certain triggering event, the player of that gaming machine experiences audio outputs and lighting patterns that are substantially similar to audio outputs and lighting patterns that would be experienced if the player encountered the same triggering event at a different gaming machine.

It should be noted that the invention contemplates a gaming machine system having a multitude of differing audio and visual effects, each being dictated by a certain triggering event. Further, in some situations, only certain speakers 52 and projecting lights 54 are actuated such that the audio and visual effects may be directed to only gaming machines 10*a-d*, while players at the gaming machines 10*e-h* do not experience the full audio and visual ambience.

The speakers 52 broadcast audio output to the players of the gaming machines 10*a-h*, as well as spectators adjacent to the gaming machine 10. The audio output may include various outputs, such as messages related to the gaming machines 10*a-h* being played (e.g., informational or instructional content), messages unrelated to the gaming machines 10*a-h*, a certain type of music (e.g., rock, classical, jazz, etc.), or music related to a theme of a game being played on one or more of the gaming machines 10*a-h*. Preferably, the relative orientation of the speakers 52 and the gaming machines 10*a-h* allows the speakers 52 to deliver surround sound to the players of the gaming machines 10*a-h*. Also, if different gaming machines 10*a-h* with different themes are grouped together, then the speakers 52 preferably are capable of delivering audio outputs corresponding to the different themes.

Also, the speakers 52 may work in conjunction with the typical speakers that are mounted with the gaming machines 10*a-h* to deliver enhanced effects. For example, while playing a gaming machine with a game-show theme, the gaming machine speakers may instruct the player, "OK, you now need to choose a prize from behind door number 1, door number 2, or door number 3." After making the selection and achieving a positive result, the remote speakers 52 can deliver an audio output that makes the player feel as though he or she is in a virtual studio audience where the audience is clapping. The projecting light 54 may also focus a light pattern on the player at this point as well. Then, the gaming machine speakers may instruct the player, "The audience really loved that choice!"

In one preferred embodiment, the speakers 52 deliver focused audio output to only certain regions of the gaming room 50 (audio 3D). Accordingly, in addition to the projecting lights 54 being able to focus the light pattern on one gaming machine, the speakers 52 can focus the audio output on one gaming machine as well.

The projecting lights 54 are preferably luminaires, which are complete lighting units capable of delivering focused light to a certain area, as is commonly used in concerts and theatres. Luminaires have their own internal control mechanisms for various photometrics, such as colors, beam divergence, intensity, strobing, etc. Preferably, the luminaires used in the gaming room 50 have motors for changing the position of the beam (e.g., from the first gaming machine 10*a* in a bank, to the last gaming machine 10*d* in the bank) and the beam divergence (e.g., beams where the angle of divergence changes over a short period of time). As such, luminaires provide for dynamic control of the beams in the gaming room 50. Example of luminaires useful for the gaming room 50 are manufactured and sold by Vari-Lite Inc. of Dallas, Tex.

Alternatively, the projecting lights 54 may also be fixed lights providing focused beams to only certain parts of the gaming room 50. As an example, each gaming machine 10*a-h* may have a set of fixed lights that are remotely located therefrom, and capable of delivering light to only that gaming machine 10*a-h*.

FIG. 4 illustrates one method of the processing of audio signals within the audio and visual effects system of the invention. Here, the A/V controller 23 includes a media storage device to store the A/V data, which includes digital audio data. A microcontroller or microprocessor within the A/V controller 23 receives the digital audio data and sends it to a D/A converter. The analog signals leaving the D/A converter are amplified and the amplified analog signals are then sent to the various speakers 52 throughout the gaming room. If the gaming room 50 (FIG. 3) only requires a certain audio output in one region, the audio data may have some location data to ensure that the audio output is broadcast in the desired region, likely by actuating only certain ones of the speakers 52.

FIG. 4 illustrates a set of speakers 52 that can provide a surround-sound audio experience. The speakers 52 include rear left speakers, rear right speakers, front left speakers, front right speakers, center speakers, and subwoofers. The various formats for the audio data sets that can be used by the embodiments of the invention for delivering surround sound are described in detail in commonly-assigned U.S. patent application Ser. No. 11/181,113, entitled "Gaming System With Surround Sound," filed Jul. 14, 2005, and incorporated herein by reference in its entirety.

In a similar fashion to FIG. 4, the control of the projecting lights 54 is dictated by the A/V data stored in the media storage device of the A/V controller 23. The type of visual control data that is to be transmitted from the microprocessor to the projecting lights 54 depends on the type of projecting lights 54. If the projecting lights 54 have motors to steer their beams, the visual control data needs to have some location data to ensure the light patterns are created at the appropriate location in the gaming room 50. Preferably, the data is digital and is sent in a digital format to the projecting lights 54, which is then processed by local controllers in the projecting lights 54 for developing the selected light pattern. As such, the D/A converter and amplifier in FIG. 4 may not be needed for the visual control data sent to the projecting lights 54.

In short, in the preferred embodiment, the media storage device in the A/V controller 23 stores the various light patterns that can be selected and sends "high-level" instructions to the projecting lights 54 corresponding to the selected light pattern. The local controllers at the projecting lights 54 then converts the "high-level" instructions to "low-level" instructions, which are internally used by the projecting lights 54 to control internal components such as lenses, motors, power supplies, etc., to result in the desired light pattern corresponding to the triggering event. As an example, "high-level" instructions may be to focus a red beam on gaming machine 10*a*. The corresponding "low-level" instructions would be for the motor to adjust the location of the beam to coordinates x, y, z, (where gaming machine 10*a* is located) and for switching the color filter to one that will result in a red light. To achieve this type of control, the A/V controller 23 may employ lighting control hardware and software for communicating with the projecting lights 54. This lighting control hardware and software is commonly available from manufacturers of luminaires, such as Vari-Lite, Inc. of Dallas, Tex.

It should be noted that the invention contemplates that the A/V controller 23 may comprise two distinct controllers, one for controlling the audio output and one for controlling the light patterns. The two distinct controllers may be remotely located from each other. Each would receive signals identifying the occurrence of certain triggering events.

Figure 5:
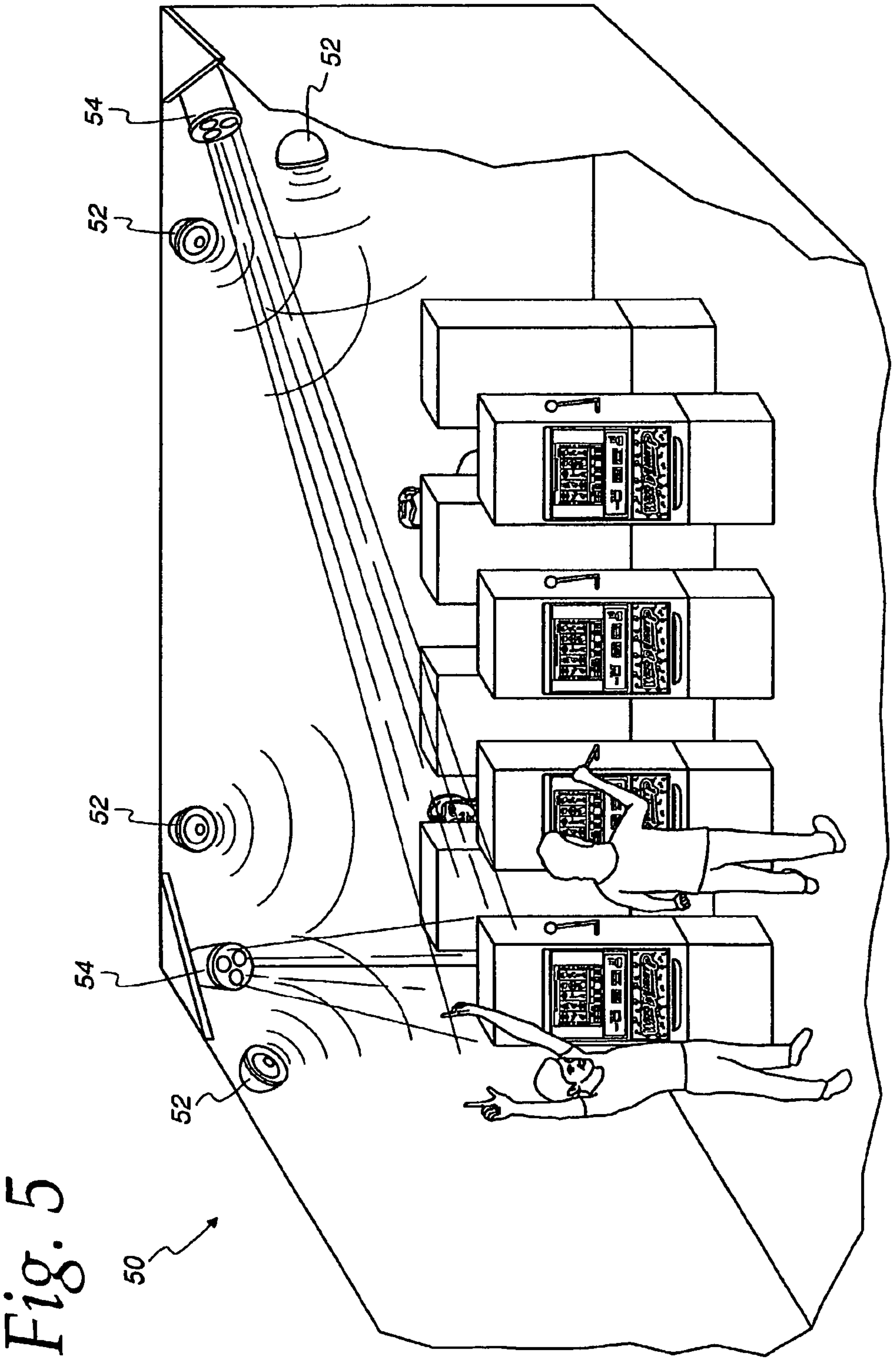
FIG. 5 illustrates a gaming room according to one embodiment of the invention in which one gaming machine has achieved a certain outcome, causing enhanced audio and visual effects to be presented to the gaming room.

FIG. 5 illustrates one type of result that can be achieved by the audio and visual effects system in a gaming room 50 having remotely located speakers and remotely located projecting lights 54 in accordance to the invention. In this embodiment, the triggering event for the enhanced visual and audio ambience is achieving a certain game outcome at one of the gaming machines 10. In response to this triggering event, the A/V controller 23 (not shown in FIG. 5) receives a signal from the gaming machine 10 that indicates that it has achieved this certain game outcome (e.g., the entry into a bonus game mode). The A/V controller 23 would then cause the actuation of the projecting lights 54 and speakers 52 to result in a certain audio output and light pattern. As shown, some of the projecting lights 54 in the gaming room have focused their beams on the wining gaming machine. Alternatively, knowing the location where the player would stand or sit relative to the gaming machine 10, the projecting lights 54 may focus their beams at that location where the player would normally be standing or sitting.

There is a wide variety of audio output that can be broadcast from the speakers 52. If the gaming machine has a game-show theme, the audio output may simply be sounds simulating an excited studio audience from a game-show. When coupled with the focused light patterns, the player may feel that he or she is totally immersed in a game-show environment. Or the audio output may be music that is indicative of the game outcome, such as the song "We Are The Champions" by the musical group Queen. Still further, music lacking lyrics, but which is fast and upbeat, could be broadcast from the speakers 52 to indicate a positive game outcome. The focused audio output defines, in essence, a sound stage for the player of the gaming machine.

In short, the enhanced visual and audio ambience in the gaming room 50 of the invention further enhances the level of player excitement. Players not typically desiring to play these types of games are much more likely to be intrigued by the gaming machine, resulting in a larger market of players for gaming machines providing these enhanced audio and visual effects. Further, because some players may not enjoy being the focal point of attention, the gaming machines may have inputs that allow the players to avoid the enhanced audio and visual experience after he or she achieves a certain outcome.

Figure 6:
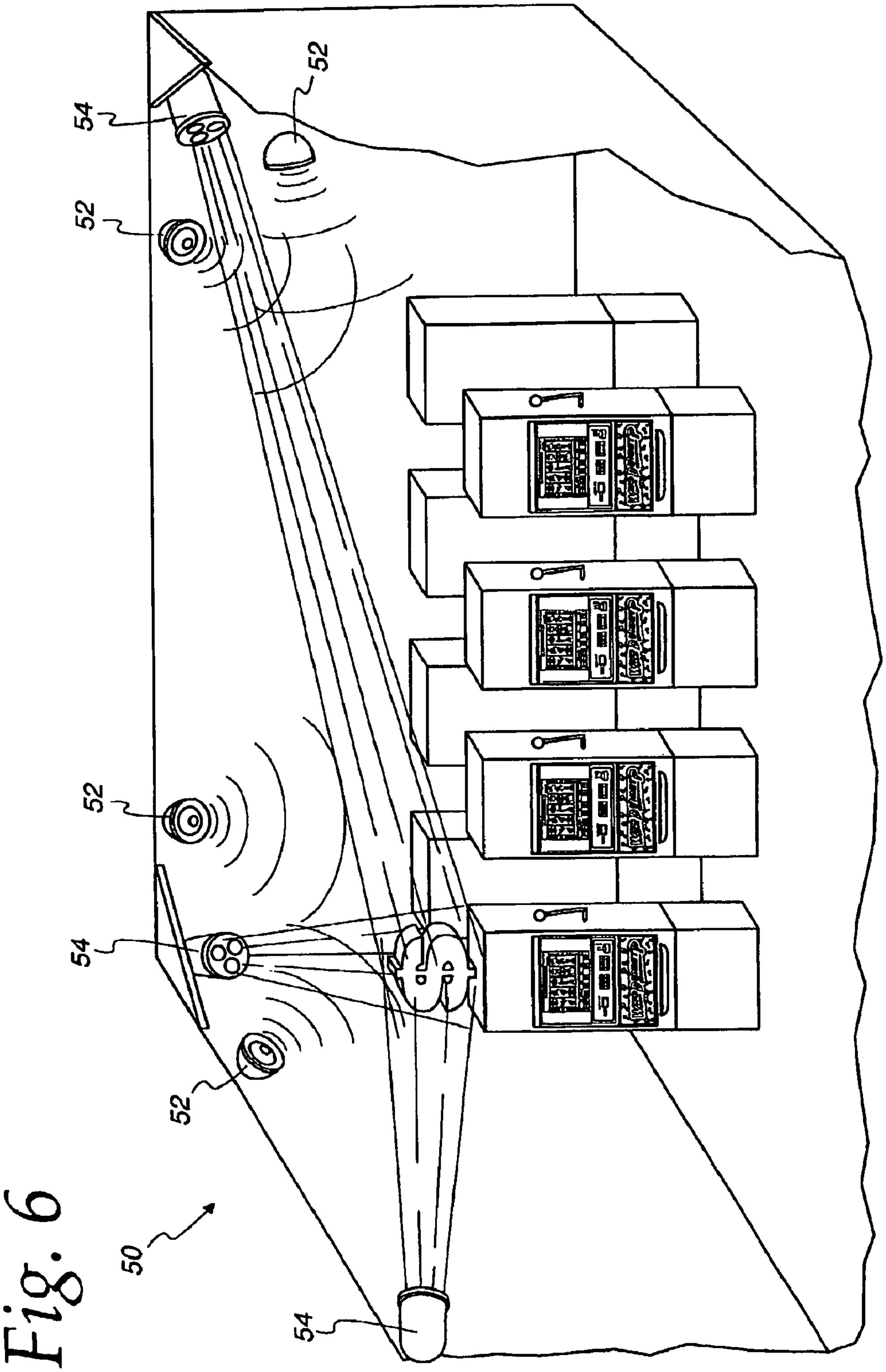
FIG. 6 illustrates a gaming room according to another embodiment of the invention where an attract mode with enhanced audio and visual effects are presented to the gaming room.

FIG. 6 is similar to FIG. 5 as it illustrates the gaming room 50 with the speakers 52 and the projecting lights 54. However, the triggering event is inactivity of one or more gaming machines over a certain period of time, causing the system to operate in an "attract mode" to stir interest from players in the vicinity of the gaming machines. As such, one or more of the gaming machines sends a signal indicating inactivity after a predefined period of time. In the attract mode, the light pattern could be the focusing of beams on an inactive machine, and it may be accompanied by an audio output that may state "This machine wants to give away money!! Who wants the money?"

Alternatively, and as shown in FIG. 6, the gaming room 50 may have objects positioned above the gaming machines that allow for the display of images above the gaming machines. As an example, the object can be relatively transparent so that it is generally unnoticed by the players of the gaming machines. Such an object may be a thin layer of plastic or other target material capable of displaying an image. Instead of simply directing light beams, the projecting lights 54 project focused images that are displayed on the object above the gaming machine. As shown in FIG. 6, the recognizable image is a dollar sign.

Alternatively, the projecting lights 54 may be of a type that provides a floating, volume-filling image that has substantial 3-dimensional qualities (e.g., an autostereoscopic image). For example, such an image may be of a gaming machine that has a highly desirable game outcome on its display, perhaps leading players to believe that the actual gaming machine below this 3D image may soon yield such an outcome. To produce such images, more sophisticated projecting lights 54 are needed, as well as a rotating display for the image. Such systems are available from Actuality Systems, Inc. of Burlington, Mass.

Instead of (or in addition to) the projecting lights 54, in some embodiments, light signs, flat panel LCD, plasma screens, projection screens, and other suitable types of graphical and/or textual displays may be used. These visual displays may then be combined with the speakers 52 and various other stimuli-generating mechanisms to present the players with information in multiple media (e.g., visual, audio, tactile, etc.). Such multimedia stimuli have been observed to be more effective for creating ambience and atmosphere, particularly a celebratory atmosphere, than either audio or visual stimulus alone. To help create a celebratory atmosphere, the content of the multimedia stimuli may be congratulatory in nature and may include, for example, text messages, images, videos, songs, music, verbal announcements, physical cues, and so forth. The use of celebratory multimedia stimuli allows the casino to propagate the impression that players are frequently winning at the casino (and winning big), thereby raising the excitement and anticipation levels for the players.

The celebratory multimedia stimuli of the invention are especially useful in view of the somewhat subdued atmospheres seen in casinos recently as a result of the implementation of the ticket-in-ticket-out (TITO) system. The TITO system tracks a player's wagers and winnings electronically so that there is no need for the player to physically handle or carry around cash and/or coins during a gaming session. However, while the TITO system is convenient and efficient, it has had the unintended consequence of making casinos much quieter in one respect by eliminating the sights and sounds of coins being deposited into a wager acceptor or dropping into a coin bin of a gaming machine upon occurrence of a winning event. The lack of coin noise and other game play stimuli have caused some players to become disinterested and even discouraged at times, leading to a decline in game play and decreased revenue for the casinos.

Accordingly, in one implementation, celebratory audio, visual, and/or tactile stimuli are used to increase the overall level of stimuli in the casino to thereby generate a celebratory atmosphere in the casino. Upon occurrence of certain triggering events, the celebratory multimedia stimuli is presented or communicated to other players and areas on the casino floor. That is to say, the celebratory multimedia stimuli may be presented or communicated to multiple areas within and/or outside the casino in addition to (or instead of) the area where the triggering events actually occurred. This allows passersby and players who are located in possibly remote areas of the casino to also receive the celebratory multimedia stimuli. The term "remote" as used herein means that the area is far enough away from the gaming machine that a player and/or patron would be unable to otherwise discern when a triggering event has occurred and/or the particular gaming machine on which it occurred.

Another implementation involves communicating celebratory audio, visual, and/or tactile stimuli across multiple types (e.g., slot machines, video poker machines, Keno machines, etc.) and/or brands (e.g., WMS Gaming, Aristocrat, IGT, etc.) of gaming machines. Typically, each gaming machine company creates its own congratulatory messages that are played back only for its own gaming machines. However, in accordance with embodiments of the invention, any type and/or brand of gaming machine in the casino may trigger the celebratory multimedia stimuli, even though the content of the celebratory multimedia stimuli was created by a different gaming machine company or for a different type of gaming machine. That is to say, the same celebratory multimedia stimuli may be used to promote multiple types and/or brands of gaming machines. Such cross-type and/or cross-brand use of celebratory multimedia stimuli allows the casino to reach more players more frequently than it otherwise could if the stimuli were used only for one type and/or brand of gaming machine. Following is a description of a few exemplary implementations of the concepts introduced above.

Figure 7:
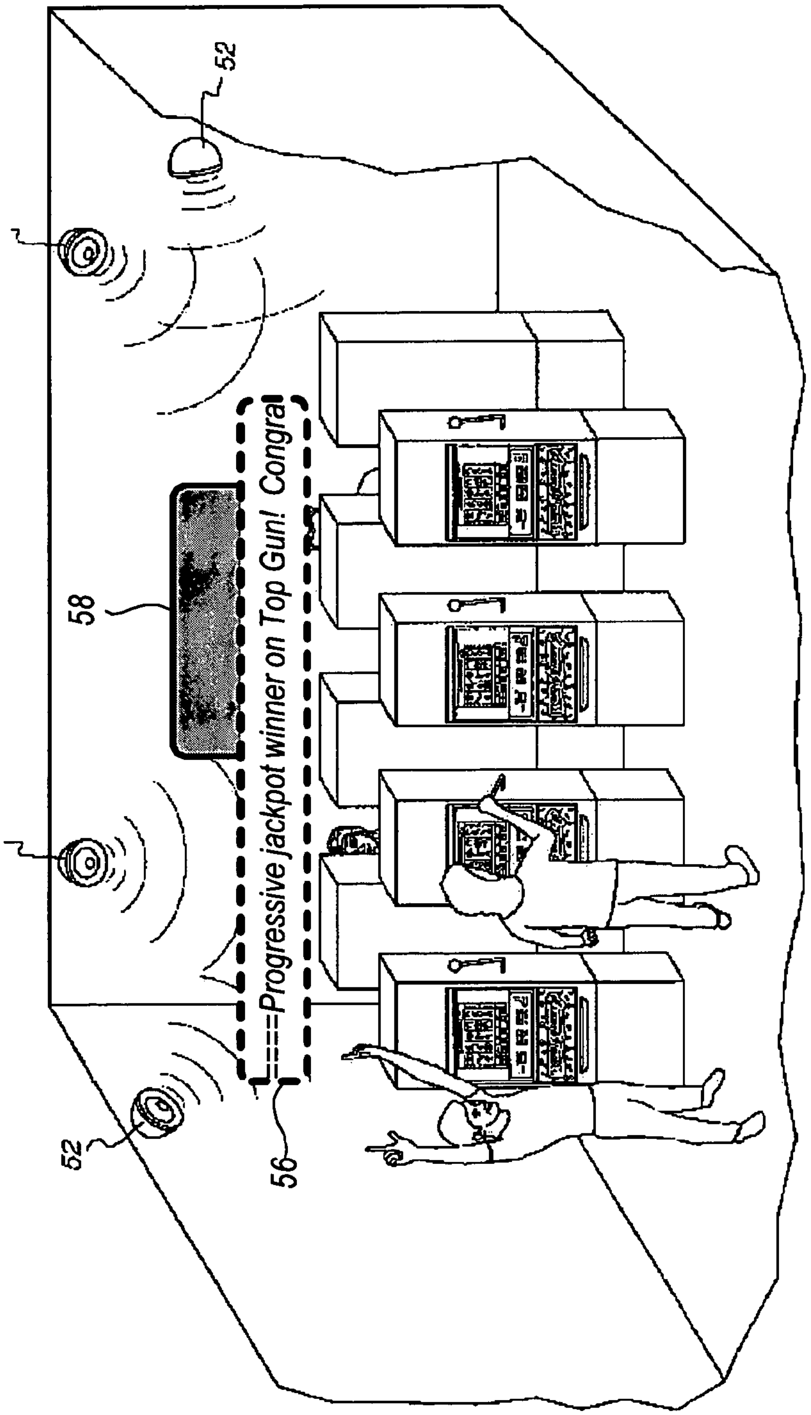
FIG. 7 illustrates a gaming room where light signs and speakers are used to provide a celebratory environment according to embodiments of the invention.

Referring now to FIG. 7, the banks of gaming machines 10*a-d* and 10*e-h* from FIG. 5 are shown again, but the projecting lights 54 have been replaced with an overhead light sign 56 and/or graphical display 58 (e.g., LCD, plasma screen, etc.) prominently mounted above each bank. The overhead light sign 56 and/or graphical display 58 may then be used in conjunction with the speakers 52 and other multimedia devices known to those having ordinary skill in the art to communicate celebratory multimedia stimuli to some or all of the players at the banks of gaming machines 10*a-d* and 10*e-h*.

In accordance with embodiments of the invention, when a triggering event occurs at any one of the gaming machines 10*a-h*, celebratory multimedia stimuli may be communicated across preferably (but not necessarily) all of the banks of gaming machines in the casino. This allows the casino to communicate the celebratory multimedia stimuli to all or substantially all of the players in the casino, including those who are not in the immediate vicinity of the triggering gaming machine. These players may not even be playing gaming machines that are operated or manufactured by the company that created the content for the celebratory multimedia stimuli. Indeed, the casino may use that company's celebratory multimedia content to promote another company's gaming machines. That is to say, the casino may allow a triggering event on the second company's gaming machines to launch the first company's celebratory multimedia content. It should be noted, however, that such cross-brand initiatives will require that the first company be able to access certain data from the second company's gaming machines, as will be explained further below with respect to FIG. 10.

In some embodiments, the speakers 52, the overhead light sign 56 and/or graphical display 58 (and/or other multimedia devices) are also mounted in areas of the casino that historically have no gaming machines. Such areas may include, for example, the casino restaurants, bars, shops, salons/spas, arcades, swimming pools, and so forth. This arrangement can be seen in FIG. 8, where the speakers 52, the overhead light signs 56 and/or graphical displays 58 are mounted at various areas in the casino, including the swimming pool area where there are no gaming machines. The speakers 52, the overhead light signs 56 and/or graphical displays 58 or uses may be specifically mounted for presenting the celebratory multimedia stimuli, or they may be existing media output devices that were mounted for other purposes. A controller 60 controls the delivery of the celebratory multimedia content to the speakers 52, the overhead light signs 56 and/or graphical displays 58 in these areas. The controller 60 may be any suitable processing unit that is capable of storing and executing computer-readable instructions for delivering the celebratory multimedia content to the speakers 52, the overhead light signs 56 and/or graphical displays 58. When a triggering event occurs at one of the gaming machines 10*a-h*, the controller 60 detects or is otherwise notified of the event and causes the celebratory multimedia content to be delivered to the speakers 52, the overhead light signs 56 and/or graphical displays 58 in one or more of these areas.

Depending on the type and size of the speakers 52, the overhead light signs 56 and/or graphical displays 58 (and/or other multimedia devices), the content of the celebratory multimedia stimuli may include a simple text message, various sounds (e.g., bells, chimes, whistles, etc.), flashing and/or changing colors, still images, live and/or prerecorded video clips, real-life and/or animated video clips, songs, music, and various combinations of the above. Furthermore, the audio, visual, and other components of the stimuli may be synchronized and coordinated over the speakers 52, the overhead light signs 56 and/or graphical displays 58 to create a desired effect. For example, upon occurrence of a triggering event on a gaming machine having a western theme, Clint Eastwood may be shown riding a horse from one display 58 to the next, accompanied by the appropriate horse riding sounds (preferably in surround sound or 3D audio) and/or visuals components to create a realistic rendering of Mr. Eastwood riding his horse around the casino.

The same celebratory multimedia stimuli may be repeated each time certain triggering events occur, or the stimuli may be customized, for example, based on the particulars of the gaming machine where the triggering events occurred. In one implementation, a winning outcome on a gaming machine that has a TOP GUN™ movie theme may trigger celebratory multimedia stimuli that include the TOP GUN™ theme song, a video clip of an F-14 Tomcat fighter jet, a congratulatory text message announcing that the TOP GUN™ gaming machine has just "hit," and so forth. In another implementation, customized or specialized celebratory multimedia content may be created that is unique to the casino, for example, a phrase containing the name of the casino, a theme song, a certain color combination, and so on. The unique, casino-specific content may be originally developed for the casino by a gaming machine company, or it may a modification of existing audio and/or visual content provided to the casino by the gaming machine company.

In addition, where the events that trigger the celebratory multimedia stimuli are winning outcomes on the game machines 10*a-h*, they may be any winning outcome or they may be limited to certain winning outcomes, for example, progressive jackpot wins (e.g., local, wide area, etc.), basic game wins, bonus game wins, and so forth. Or the triggering event may be player-specific, automatically initiating the celebratory multimedia stimuli only when a member of a certain group or category of players, as determined by their tracking data, achieves a winning outcome. Alternatively, the triggering event may be amount-specific, automatically initiating the celebratory multimedia stimuli only when a certain credit amount (e.g., 10,000 credits) has been reached in the jackpot, or every time the jackpot increases by a certain incremental credit amount (e.g., 100 credits), or some other threshold.

It is also possible to trigger the celebratory multimedia stimuli independently of any gaming machine and/or winning outcome. For example, the celebratory multimedia stimuli may be automatically triggered if the total coin-in at any gaming machine 10*a-h* exceeds a certain threshold (meaning that no one has hit the jackpot for a while), or if a certain inactivity period expires on one of the gaming machines 10*a-h*. In the latter case, the celebratory multimedia stimuli may include an audio and/or visual "attract mode" message, such as "DIRTY HARRY™ hasn't hit for 30 days! Do you feel lucky?" or other similar tease messages to entice the players into playing. The celebratory multimedia stimuli may also be triggered manually by the players and/or casino operator. For example, in some embodiments, an operator interface (e.g., switch, touchscreen controls, alphanumeric input device, etc.) may be provided either on the gaming machines or elsewhere for allowing the players and/or casino operator to play back celebratory multimedia content announcing that a certain gaming tournament is about to begin, or that some/all gaming machines have been occupied/unoccupied, and the like.

Furthermore, the triggering events may be player-dependent or they may be entirely independent of the actions of the players, such as in the case of a mystery bonus prize that is randomly awarded by the casino. For example, as a way to attract players, some casinos have a promotional feature where if one player is awarded a bonus prize, all players who are currently playing are also awarded the bonus prize or some part of the bonus prize. Appropriate celebratory multimedia stimuli may be used to announce the occurrence of such a bonus to the entire casino or portions of the casino. It is also possible to limit the number of players who receive the bonus prize, for example, to only those players who currently have their player identification card inserted in one of the gaming machines 10*a-h* or who meet other eligibility requirements. Appropriate celebratory multimedia stimuli may likewise be used to announce the occurrence of such a bonus to the entire casino or perhaps only to the areas where those players are located to generate continued buzz and excitement in the casino for its patrons.

In addition to the speakers 52, the overhead light signs 56 and/or graphical displays 58, it is also possible to deliver the celebratory multimedia content to media devices at a specific gaming machine, particularly a gaming machine that is remotely located from the gaming machine on which the triggering event occurred. Some gaming machines have 3D or surround sound speakers mounted on a chair of the gaming machines, for example typically behind a player's head at the top of the chair. Celebratory multimedia content may be played back through the 3D or surround sound speakers of the chair upon occurrence of the triggering event. For more information regarding such surround sound gaming machine chairs, the reader is referred, for example, to the commonly-assigned patent application mentioned above (i.e., U.S. patent application Ser. No. 11/181,113, entitled "Gaming System With Surround Sound," filed Jul. 14, 2005).

Indeed, some 3D audio chairs may incorporate advance speaker technology (e.g., certain Bose™ speakers) that can selectively prevent audio stimuli from being heard by adjacent patrons. Thus, during the normal course of game play, only the respective players can hear their own game, thereby helping to keep the noise level down in the casino it. However, when a gaming machine hits a triggering event or has a reason to generate celebratory sounds, the slot machine and/or the chairs' speakers broadcasts out loud the celebratory sounds so that other patrons can also hear and feel the excitement of the event.

Figure 8:
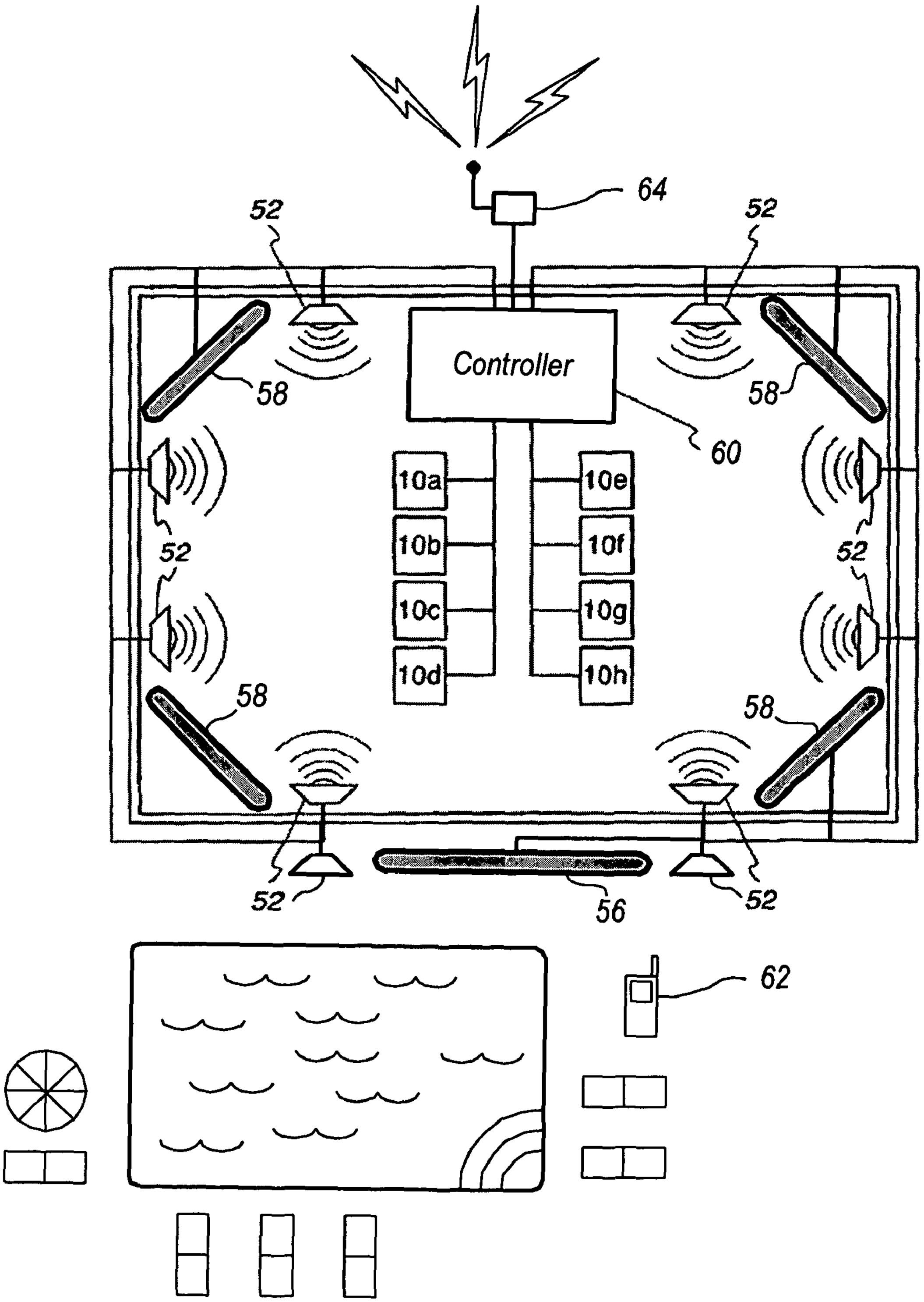
FIG. 8 illustrates a casino in which display screens and speakers are strategically mounted inside and/or outside of the casino to provide a celebratory environment according to embodiments of the invention.

It is further possible to deliver the celebratory multimedia content to nearby personal mobile devices 62. Such personal mobile devices 62 may include, for example, cellular telephones, personal digital assistants (PDA), palmtop computers, laptop computers, handheld email devices, and the like. This mode of delivery allows celebratory multimedia content to be communicated directly to individual players (as opposed to only a group of players), including those who have signed up for or have otherwise authorized the communication. Such personal mobile device communication may be implemented using any suitable technology known to those having ordinary skill in the art. In the implementation of FIG. 8, the system includes one or more short-range wireless transceivers 64 connected to the controller 60 for sending a wireless transmission to the personal mobile devices 62. Examples of short-range wireless transmission protocols that may be used include Bluetooth, Wi-Fi, Wireless Application Protocol, Radio Frequency (RF), infra-red, and the like.

In embodiments where email transmissions are available, the controller 60 may cause a group email message to be sent to players and patrons who have signed up for, or have otherwise chosen to participate in the group, upon occurrence of the triggering event. The group email message may notify the players, for example, that a certain credit amount has just been reached in a progressive jackpot (e.g., wide area progressive). The email messages may contain text content, such as "The jackpot is primed, get to the casino!" or similar messages, as well as multimedia content, such as Flash™ audio and visual content. It is also possible for the controller 60 to cause email messages to be sent on a group-by-group basis and/or on a per individual basis. For example, some players or group of players may wish to be notified only when a jackpot reaches one level (e.g., 10,000 credits, etc.), whereas other players or group of players may wish to be notified only when the jackpot reaches a different threshold level (e.g., 15,000 credits, etc.).

Figure 9:
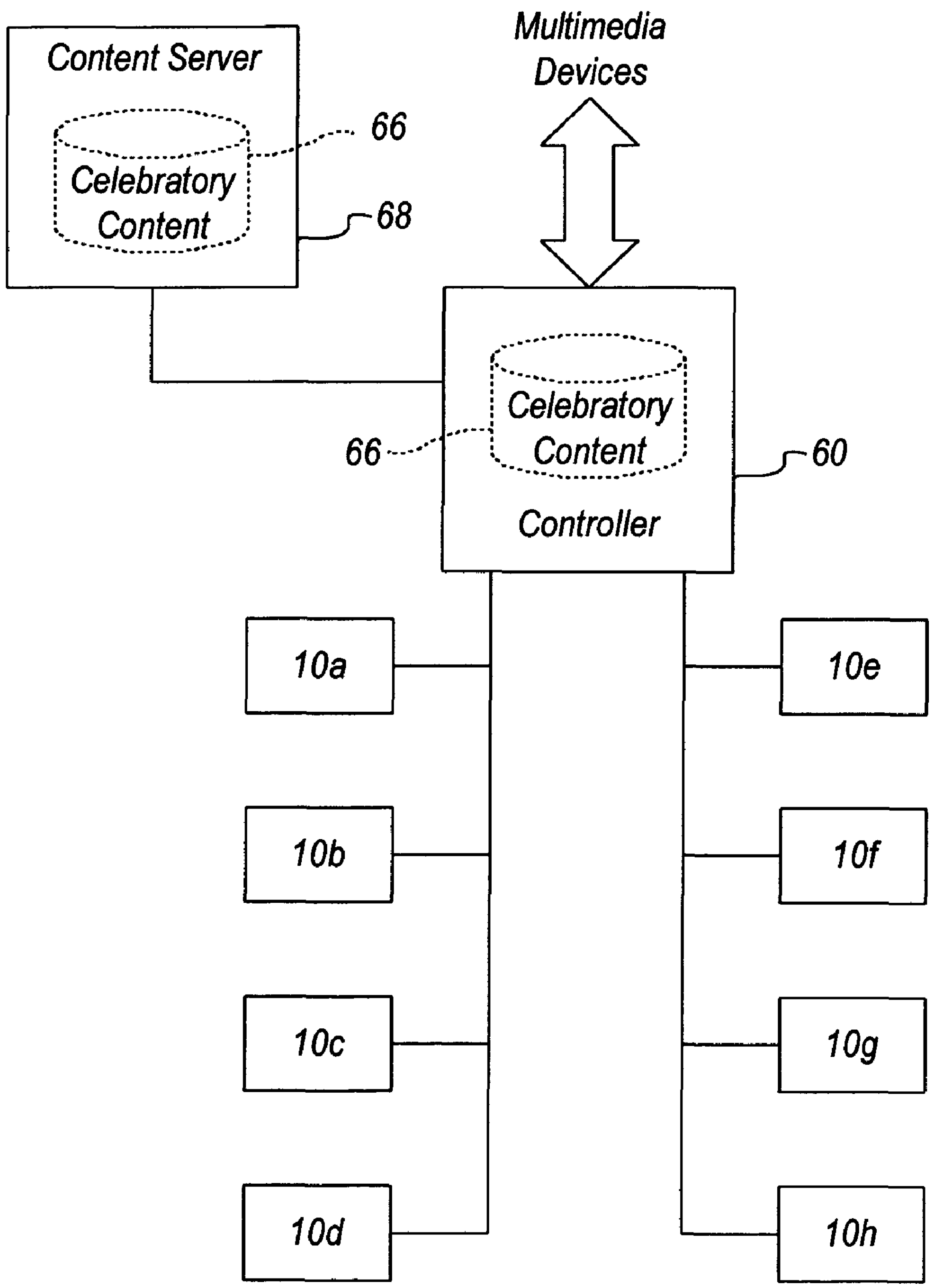
FIG. 9 illustrates a block diagram of a system that may be used to provide a celebratory environment according to embodiments of the invention.

Referring now to FIG. 9, a simplified block diagram of a conceptual system is shown that may be used to present celebratory multimedia stimuli according to embodiments of the invention. The system of FIG. 9 is similar to the system of FIG. 3 in that there is a controller (i.e., controller 60) connected to a plurality of gaming machines 10*a-h* over a network. The network may be any suitable type of network, including client-server, peer-to-peer, ring, star, and the like. The controller 60 uses the network to deliver celebratory multimedia content to the various multimedia devices (e.g., speakers 52, overhead light signs 56 and/or graphical displays 58, etc.) upon occurrence of certain triggering events. These multimedia devices may be mounted in the vicinity of the gaming machines 10*a-h* as well as in different areas within and/or outside the casino.

In one embodiment, the celebratory multimedia content is stored on each one of the machines 10*a-h* and subsequently transferred to the controller 60 when a triggering event occurs on a gaming machine 10*a-h*. The controller 60 then processes the celebratory multimedia content and delivers it over the network to the appropriate multimedia devices. Such an arrangement allows each gaming machine 10*a-h* to have its own celebratory multimedia content customized according to the particulars (e.g., a game theme) of the gaming machine 10*a-h*. In this way, players and patrons in the casino can quickly and easily recognize which one of the gaming machines 10*a-h* has triggered the celebratory multimedia stimuli based primarily on the content of the celebratory multimedia stimuli.

In another embodiment, celebratory multimedia content may be stored in a central database 66 residing on the controller 60. This arrangement has an advantage in that all celebratory multimedia content stored in the database 66 may be easily and conveniently updated at one location. In operation, upon occurrence of a triggering event, the gaming machine 10*a-h* in question sends a predefined signal to the controller 60. The controller 60 then selects the appropriate celebratory multimedia content from the database 66 for that gaming machine 10*a-h*. The selection may be made based on, for example, look-up table data contained in the signal that the controller 60 may use with a look-up table. Or the signal may merely contain variable data that the controller 60 may plug into a generic celebratory multimedia package. Alternatively, the celebratory multimedia content may be customized for a particular player so that the same celebratory multimedia stimuli are presented whenever and wherever that player achieves a winning outcome. Finally, the selection of the celebratory multimedia content may be entirely independent of the gaming machines and/or players (i.e., the controller 60 randomly selects the celebratory multimedia content).

In still another embodiment, the celebratory multimedia content database 66 may reside on a separate content server 68 instead of the controller 60. The content server 68 may then be connected to several controllers 60 at several casinos over the network. Celebratory content may then be downloaded to each controller 60 at its respective casino as needed (i.e., in real time) or according to some predetermined schedule. An advantage of this arrangement is that the celebratory multimedia content may be conveniently and easily downloaded and propagated across multiple controllers 60 and/or casinos, even those owned by different companies or even casinos located in different gaming jurisdictions.

Figure 10:
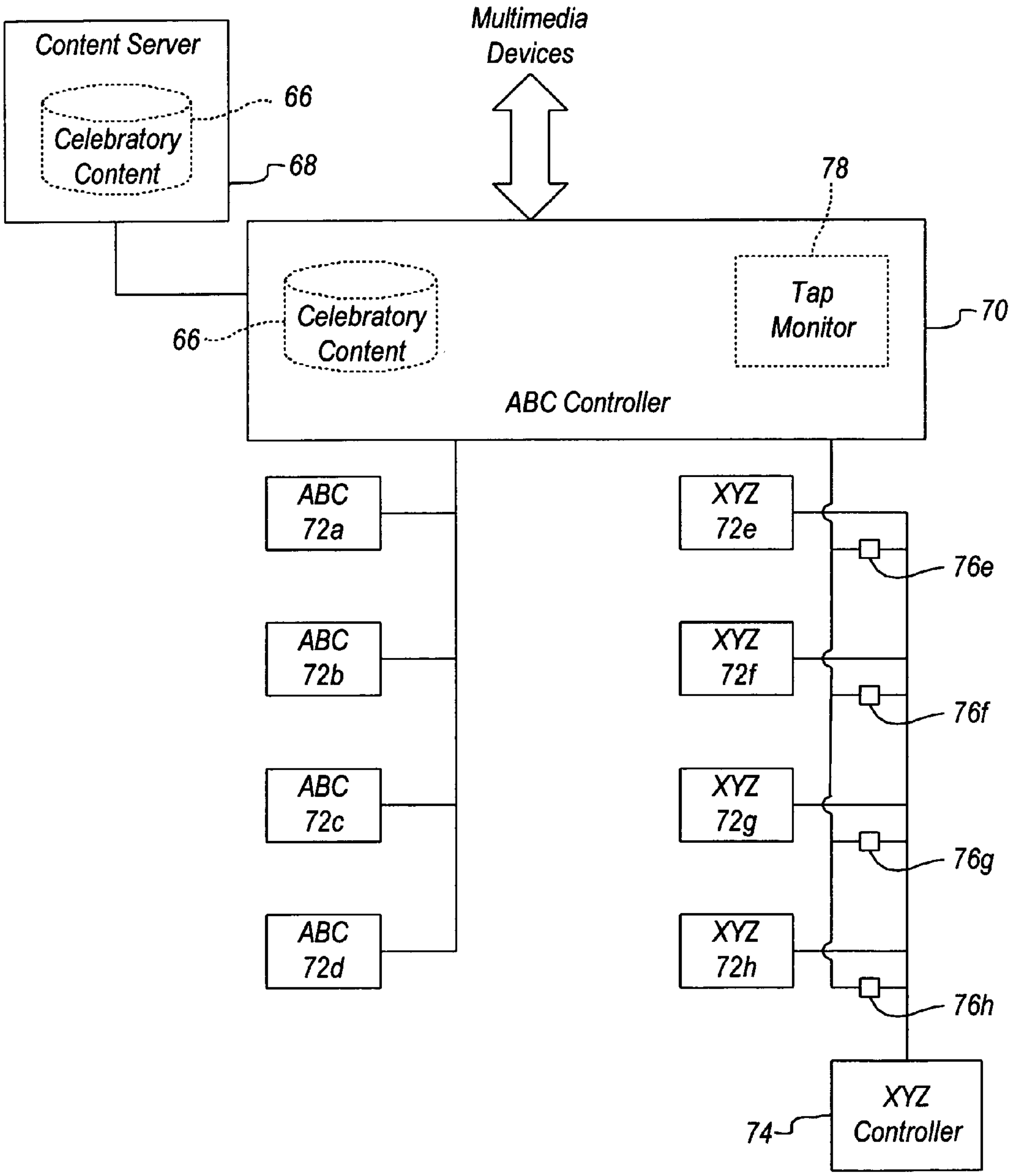
FIG. 10 illustrates a block diagram of another system that may be used to provide a celebratory environment according to embodiments of the invention.

FIG. 10 illustrates a simplified block diagram of another conceptual system that may be used to communicate celebratory multimedia stimuli in a casino. The system of FIG. 10 has the same basic architecture as the system of FIG. 9 in that there is a controller (i.e., controller 70) connected to a plurality of gaming machines 72*a-h* over a network. However, the gaming machines 72*a-h* in this embodiment are manufactured by two different companies, with gaming machines 72*a-d* having brand "ABC" and gaming machines 72*e-h* having brand "XYZ." The controller 70 is an ABC brand controller and is therefore designed to interface directly with the ABC brand gaming machines 72*a-d*, but not the XYZ brand gaming machines 72*e-h*. For the XYZ brand gaming machines 72*e-h*, the system includes a separate XYZ brand controller 74 that interfaces directly with these gaming machines 72*e-h*.

In accordance with embodiments of the invention, taps 76*e-h* are included in the system that allow the ABC controller 70 to access certain data from the XYZ brand gaming machines 72*e-h*. Such taps 76*e-h* are well known to those having ordinary skill in the art and will not be described in detail here. The taps 76*e-h* intercept the signals from the XYZ brand gaming machines 72*e-h* and forward them to the ABC controller 70. This allows the ABC controller 70 to receive essentially the same signals from the XYZ brand gaming machines 72*e-h* as the XYZ brand controller 74. For more information regarding the taps 76*e-h* and their operation, the reader is referred to, for example, commonly-assigned PCT Published Application No. WO05032674A2, entitled "Player Identification Feature for Restricted-Access Wagering Games."

A tap monitor module 78, which may be a software or a hardware module, operates to extract data from the signals of the XYZ brand gaming machines 72*e-h*. Such data is typically encoded following one of several accepted gaming industry protocols, for example, Slots Accounting System (SAS), SuperSAS, Best of Breed (BOB), and other gaming industry protocols. The tap monitor module 78 uses these accepted industry protocols to decode the desired data from the signals of the XYZ brand gaming machines 72*e-h*. Examples of the kinds of data that may be decoded from the signals include player tracking data (e.g., player identity, player wagers, player winnings, etc.), accounting data (e.g., coin-in, amounts paid, activity level, etc.), and so forth.

When a triggering event occurs at one of the XYZ brand gaming machines 72*e-h*, it is detected by the tap monitor module 78 via the taps 76*e-h*. The tap monitor module 78 then notifies the ABC controller 70 of the triggering event, after which the ABC controller 70 selects an appropriate celebratory multimedia content from the content database 66. The ABC controller 70 thereafter delivers the selected celebratory multimedia content to various areas in the casino via the multimedia devices in the manner described above. This arrangement allows the casino to use celebratory multimedia content that was originally created for one company's gaming machines (e.g., the ABC Company) to promote another company's gaming machines (e.g., the XYZ Company). Alternatively, the casino may specifically engage the ABC company (e.g., based on its demonstrated content creation expertise) to develop customized content that may be used for some or all the gaming machines in the casino, including the XYZ company's gaming machines.

Some casinos, as a way of generating interest and excitement, require players who have achieved an outcome deserving a celebratory event to replay or finish out their winning game at a publicly visible or central location instead of at the gaming machine where the winning outcome actually occurred. In one example, upon occurrence of a winning outcome at a gaming machine, the player is instructed to remove himself/herself to a pre-designated gaming machine, usually at a centrally located location. There, the player replays or finishes out his/her winning game (the data for which was transferred from the winning gaming machine to the centrally located gaming machine) in order to receive the credit amount won. This allows patrons and players elsewhere in the casino to gather around and view, and thereby vicariously experience, the winning outcome.

Figure 11:
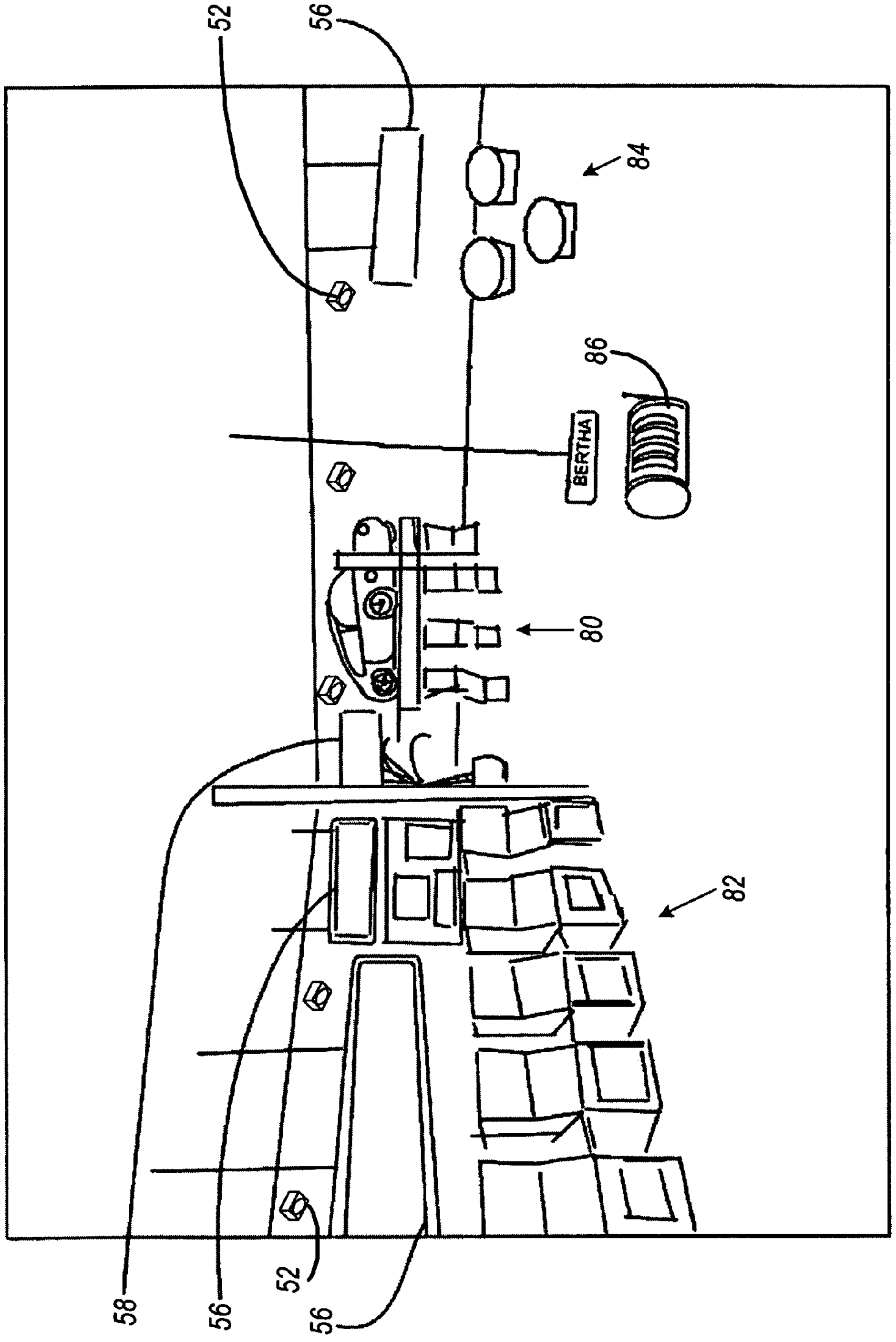
FIG. 11 illustrates a casino floor in which players play out their winning outcomes in a publicly visible or central location according to embodiments of the invention.

In accordance with embodiments of the invention, appropriate celebratory multimedia stimuli may be communicated to the players and patrons in the casino to announce and promote the above feature. An exemplary implementation of this embodiment is shown in FIG. 11. As can be seen, the casino includes a plurality of loosely defined areas, including a video slot machine area 80, a video poker area 82, and a dining area 84. A pre-designated gaming machine 86, for example, a "Big Bertha" gaming machine, is positioned in the middle of the casino floor or other publicly visible location. The pre-designated gaming machine 86 is used to reenact or finish out, in a public and visible way, winning games that players may have achieved at a similar gaming machine. Speakers 52, overhead light signs 56 and/or graphical displays 58 (and/or other multimedia devices) are strategically mounted in the vicinity of the stations 80-84 to communicate appropriate celebratory multimedia stimuli to the players and patrons at those stations. The celebratory multimedia stimuli help to announce, promote, and otherwise generate interest in the casino for the reenactment of the winning games.

While the invention has been described with reference to one or more particular embodiments, those skilled in the art will recognize that many changes may be made thereto without departing from the spirit and scope of the invention. For example, it should be clear to those of ordinary skill in the art that the gaming machines described herein may be any type of gaming machines, including gaming machines where the outcomes for each gaming machine are determined locally by the gaming machine themselves, or gaming machines where the outcomes are determined elsewhere, for example, by a controller or controllers on a network, and subsequently downloaded to the gaming machines, such that the gaming machines function primarily to present the outcomes. Each of these embodiments and obvious variations thereof is contemplated as falling within the spirit and scope of the claimed invention, which is set forth in the following claims.

What is claimed is:

1. A method of creating a celebratory atmosphere in a casino, the casino having a first area and a second area distinct from the first area, the method comprising:

receiving a wager input at a gaming machine in the casino;

conducting a wagering game via the gaming machine, the wagering game having an outcome randomly selected from a plurality of outcomes, the plurality of outcomes including a special events outcome; and in response to the special events outcome being selected as the outcome, using a controller to select a first celebratory multimedia presentation from a multimedia content database and cause the first celebratory multimedia presentation to be delivered to one or more first media devices in the first area of the casino, and using the controller to select a second celebratory multimedia presentation from the multimedia content database and cause the second celebratory multimedia presentation to be delivered to one or more second media devices in the second area of the casino;

wherein the first celebratory multimedia presentation is at least partially different in format from the second multimedia presentation; and wherein the first and second areas of the casino are remote from the gaming machine such that, in the absence of the first and second celebratory multimedia presentations, patrons in the first and second areas are unable to discern that the special events outcome has been selected as the outcome.

2. The method of claim 1, wherein the first and second media devices are selected from a group consisting of speakers, graphical displays, lights, and personal mobile devices.

3. The method of claim 1, wherein the first and second celebratory multimedia presentations are in respective formats including different combinations of audio, video, and lighting.

4. The method of claim 1, wherein the first and second media devices are not included in any gaming machines within the casino.

5. The method of claim 1, wherein the first celebratory multimedia presentation is synchronized and coordinated over the one or more first media devices.

6. The method of claim 1, wherein the multimedia content database resides within the controller.

7. The method of claim 1, wherein the multimedia content database resides external to the controller.

8. The method of claim 1, wherein the controller selects the first and second celebratory multimedia presentations based on a look-up table stored in the multimedia content database.

9. A system for creating a celebratory atmosphere in a casino, the casino having a first area and a second area distinct from the first area, the casino including a gaming machine for receiving a wager input and presenting a wagering game, the wagering game having an outcome randomly selected from a plurality of outcomes, the plurality of outcomes including a special events outcome, the system comprising:

a multimedia content database for storing first and second celebratory multimedia presentations, the first celebratory multimedia presentation being at least partially different in format from the second multimedia presentation; and a controller, in response to the special events outcome being selected as the outcome, configured to select the first celebratory multimedia presentation from the multimedia content database and cause the first celebratory multimedia presentation to be delivered to one or more first media devices in the first area of the casino, and select the second celebratory multimedia presentation from the multimedia content database and cause the second celebratory multimedia presentation to be delivered to one or more second media devices in the second area of the casino;

wherein the first and second areas of the casino are remote from the gaming machine such that, in the absence of the first and second celebratory multimedia presentations, patrons in the first and second areas are unable to discern that the special events outcome has been selected as the outcome.

10. The system of claim 9, wherein the first and second media devices are selected from a group consisting of speakers, graphical displays, lights, and personal mobile devices.

11. The system of claim 9, wherein the first and second celebratory multimedia presentations are in respective formats including different combinations of audio, video, and lighting.

12. The system of claim 9, wherein the first and second media devices are not included in any gaming machines within the casino.

13. The system of claim 9, wherein the first celebratory multimedia presentation is synchronized and coordinated over the one or more first media devices.

14. The system of claim 9, wherein the multimedia content database resides within the controller.

15. The system of claim 9, wherein the multimedia content database resides external to the controller.

16. The system of claim 9, wherein the controller selects the first and second celebratory multimedia presentations based on a look-up table stored in the multimedia content database.

17. A method of creating a celebratory atmosphere in a casino, the casino having a first area and a second area distinct from the first area, the method comprising:

receiving a wager input to play a wagering game via a gaming machine in the casino; and in response to a triggering event during play of the wagering game via the gaming machine, using a controller to select a first celebratory multimedia presentation from a multimedia content database and cause the first celebratory multimedia presentation to be delivered to one or more first media devices in the first area of the casino, and using the controller to select a second celebratory multimedia presentation from the multimedia content database and cause the second celebratory multimedia presentation to be delivered to one or more second media devices in the second area of the casino;

wherein the first celebratory multimedia presentation is at least partially different in format from the second multimedia presentation; and wherein the first and second areas of the casino are remote from the gaming machine such that, in the absence of the first and second celebratory multimedia presentations, patrons in the first and second areas are unable to discern the occurrence of the triggering event.

18. The method of claim 17, wherein the first and second media devices are selected from a group consisting of speakers, graphical displays, lights, and personal mobile devices.

19. The method of claim 17, wherein the first and second celebratory multimedia presentations are in respective formats including different combinations of audio, video, and lighting.

20. The method of claim 17, wherein the first and second media devices are not included in any of the plurality of gaming machines within the casino.

21. The method of claim 17, wherein the first celebratory multimedia presentation is synchronized and coordinated over the one or more first media devices.

22. The method of claim 17, wherein the multimedia content database resides within the controller.

23. The method of claim 17, wherein the multimedia content database resides external to the controller.

24. The method of claim 17, wherein the controller selects the first and second celebratory multimedia presentations based on a look-up table stored in the multimedia content database.

25. The method of claim 17, wherein the triggering event is selected from a group consisting of achieving a certain game outcome at any of a plurality of gaming machines within the casino, exceeding a certain threshold of total coin-in at any of the plurality of gaming machines, and exceeding a certain inactivity period of time at any of the plurality of gaming machines.

* * * * *